March 19, 1968  P. V. METCALFE ET AL  3,374,012

TIE LUG

Filed Sept. 12, 1966  2 Sheets-Sheet 1

INVENTOR.
PAUL V. METCALFE
JAMES D. FORD
BY

Cox and Sheridan
ATTORNEYS

United States Patent Office 3,374,012
Patented Mar. 19, 1968

3,374,012
TIE LUG
Paul V. Metcalfe, Columbus, Ohio (367 Riverside Drive, Tequesta, Fla. 33458), and James D. Ford, 1479 Blaine Drive, Columbus, Ohio 43227
Filed Sept. 12, 1966, Ser. No. 578,752
8 Claims. (Cl. 285—114)

ABSTRACT OF THE DISCLOSURE

This invention relates to improvements in tie lugs for use in plumbing installations. More particularly the invention concerns a lug for anchoring the end of a tie rod at a bell flange and spigot pipe joint and for sealing more effectively the bell flange and spigot joint. One portion of the lug designated herein as the lower portion of the lug is positioned on a bolt which connects the bell flange and the gland and is inserted between said bell flange and said gland. The other end of the lug designated herein as the upper portion is formed to hold securely the end of a tie rod. The tie lug is designed in such a manner that when the tie rod is tightly anchored to the lug, pressure is thereby exerted on the gasket between the bell flange and the gland with the result that a more effective seal is achieved.

Background of the invention

Figure 1:
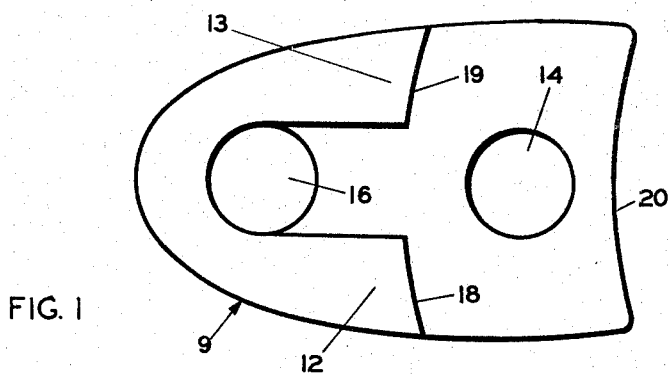

Methods of securing together sections of pipe and fastening flanges and glands are highly developed. The bell flange of one pipe and the gland on an adjoining pipe are usually held together by bolts and nuts.

However, often it is necessary or desirable to use tie rods to connect the two pipe components themselves (as distinguished from the connection between the flanged bell formed on the end of one pipe component and the gland which simply encircles the end of the other pipe component). Such tie rods are desirable to oppose the tendency of internal fluid pressure to cause separation of adjoining pipes at the joints. Tie rods are also desirable for the reason that they are able to span intervening coupling flanges of such other pipe installations as valves, T-fittings and the like.

The tie lug herein described and claimed constitutes an improvement in the art because, not only does it anchor a tie rod in an improved manner, thus preventing relative movement among the sections of pipe, but it also effects a better seal for the joint to which it is attached. The tie lug performs these several functions in a much simpler and more effective manner than does the prior art.

P. D. Dilley in Patent No. 3,010,736 discloses a rod bracket for use in anchoring tie rods. In column 3, line 2 of his patent, Dilley states that an unexpected advantage of his invention is the increased pressure on the packing ring used to seal the joint. Dilley's invention does successfully anchor tie rods and does increase the pressure on the packing ring; however, there are several weaknesses in Dilley's bracket which the inventor was unable to eliminate. All the forces created by the tightening of the nut on the end of the tie rod and nut on the end of the T-bolt are exerted on the head of the T-bolt, which in turn is pulling against the threads on the T-bolt nut. The threads of the single T-bolt holding the bracket in place are thus subjected to a high shearing stress. This is an unfortunate situation, for should the T-bolt fail, not only would the tie rod become unanchored, but the joint would become substantially weakened and might leak. Also, Dilley's bracket is formed with a special aperture which requires that a special T-bolt be used for connecting the bell flange to the gland rather than the standard bolt which is used at other points on the same joint.

C. S. Stephens in Patent No. 3,144,261 discloses an eye-bolt securing device for use in anchoring the ends of tie rods. It would seem that by tightening the nuts on the end of the tie rod one would also increase the pressure of the gland on the packing. However, the problem inherent in this invention is that the eye portion of the bolts are incapable of withstanding high tension. When a high pressure is exerted on the joint or a strong force on the tie rod, the eye bolts will pull open because of their open stems.

Objects

It is, therefore, an object of our invention to provide a tie lug which firmly anchors the end of a tie rod and which cooperates with the gland to effect a strong seal for a pipe joint.

It is another object to provide a tie lug which is easy to install and which does not require any special bolts other than those already in use with the joint, in order that the lugs be held in place.

It is another object to provide a tie lug which will securely hold the tie rod and effect a strong seal when the tie rod is subject to high tension or the joint is subject to high pressure.

It is a further object of our invention to provide a tie lug which distributes the forces acting on the lug to other parts of the joint and does not concentrate all of them on one point.

Further objects and features of our invention will be apparent from the following specification and claims when considered in connection with the accompanying drawings illustrating several embodiments of our invention.

Drawings

Figure 3:
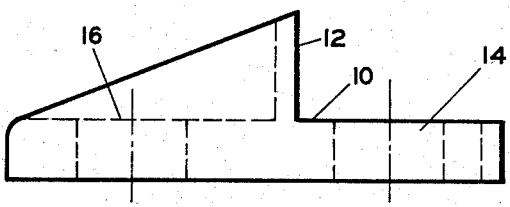
Figure 2:
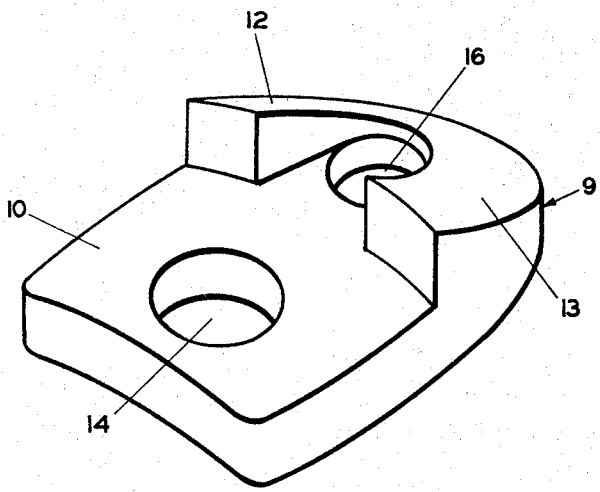
Figure 4:
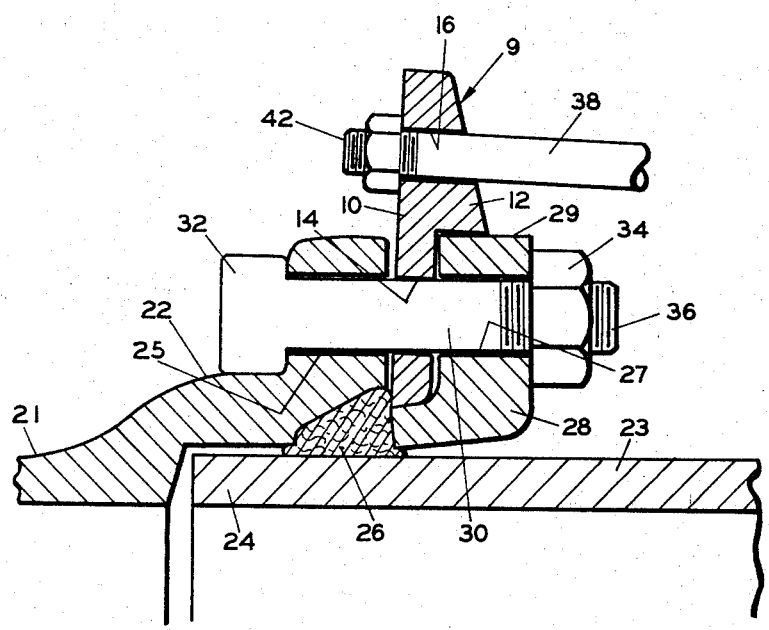
Figure 5:
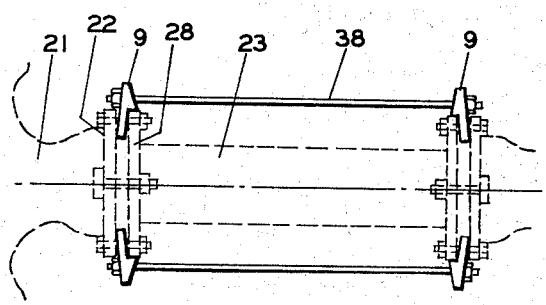

In the drawings:

FIG. 1 is a horizontal plan view of the tie lug;
FIG. 2 is a view in perspective of the tie lug;
FIG. 3 is a side elevation view of the tie lug;
FIG. 4 is an elevation view of a pipe coupling to which is attached our improved tie lug, parts of the drawing being cut away; and
FIG. 5 is a plan view of two pipe joints utilizing our invention.

Turning now to the specific embodiment of the invention selected for illustration in the drawings, it can be seen that our improved tie lug, designated generally by the number 9, consists of a body 10 having raised flanges or shoulders 12 and 13. The body 10 contains two holes, hole 14 in the lower portion of the body 10 and hole 16 in the upper portion of the body 10. The base of the body 10 and the bases of the shoulders 12 and 13 are curved inwardly as at 18, 19, and 20. The curved surfaces make for a better fit around the gland.

In FIG. 4 can be seen parts of the coaxial pipes 21 and 23 which are formed with the bell flange 22 and spigot end 24, respectively. Between the adjoining ends, bell flange 22 and spigot end 24, there is a gasket 26 which is held in place by means of a gland 28 which is spaced from the bell flange 22. Several T-bolts, such as the T-bolt 30 with a head 32 and a nut 34 secured on threads 36, prevent any relative motion between flange 22 and gland 28. The tie lug 9 is positioned between the bell flange 22 and gland 28 in such a manner that one T-bolt, here T-bolt 30, extends through the hole 14 and the tie rod 38 extends through the hole 16. A nut 40 is turned on the threads 42 on the end of the tie rod until the tie rod 38 is firmly anchored to our tie lug 9.

Operation

In operation, the ends 22 and 24 of pipes 21 and 23, respectively, are brought into coaxial alignment, but before the spigot end 24 is telescoped into the bell flange end 22, the gland 28 and gasket 26 are slipped onto the periphery of the pipe 23. The spigot end 24 is then moved into the bell flange end 22. The tie lug 9 is positioned between the bell flange 22 and gland 28 in such a manner that the bolt hole 25 in the bell flange 22, the hole 14 in our tie lug 9, and the bolt hole 27 in gland 28 are in alignment. When the tie lug 9 is in this position, the shoulders 12 and 13 should extend over the outer surface 29 of the gland 28. The T-bolt 30 is then inserted through the three holes and the bell flange, tie lug, and gland are tightened by nut 34 on the threads 36 of the T-bolt 30. It should be noted that due to the unique construction of our tie lug it is quite impossible to install the lug in any position except the correct one.

A tie rod 38 can now be anchored by the tie lug 9 by inserting the end of the tie rod 38 through hole 16. The tie rod 38 is securely fastened to the tie lug 9 by means of the nut 40 and threads 42 on the end of the tie rod.

When the nut 40 has been substantially tightened, there is imparted to tie lug 9 a torque movement which forces the gland 28 into a much tighter contact with gasket 26. This torque movement is caused by the force of the tie rod 38 acting on lug 9 which pivots about its lower portion. The torque force is transmitted to gland 28 at the points at which the gland is contacted by the body 10 and the shoulders 12 and 13. It is to be noted that the hole 14 in the tie lug 9 is slightly larger in diameter than the T-bolt 32. This hole largeness not only allows the advantage of easy assembly and disassembly, but insures the fact that the tie lug 9 will be capable of pivoting on the T-bolt 30 so that the body 10 and shoulders 12 and 13 press against the surfaces of the gland 28.

Another advantage of our invention is that it reduces the amount of force on the T-bolt head 32 and reduces the shearing stress on threads 36 from that of the prior art. This is explained by the fact that the force created by the tie rod 38 does not act only on the bolt 30. Instead the tension on the tie rod creates a torque on the tie lug 9 which is transmitted to gland 28. The torque on the gland 28 is distributed to the other bolts in use to connect the gland to the bell flange. Thus, all the bolts on the joint oppose the force of the tie rod 38, rather than just the one holding the tie lug in place. Hence, as a result of our tie lug 9, the shearing stress on the T-bolt head 32 and threads 36 is reduced and a tighter seal of the gasket 26 is attained.

Another important advantage of our tie lug over the prior art is that no special flange bolts are required when our invention is used. All that is required for the use of our improvement is the tie lug itself, since it is designed for use with the standard pipe coupling, T-bolts and nuts. Also, our invention is an improvement over the prior art in that it permits the use of shorter tie rods.

We have found that the objects and advantages of our improvement can be best achieved in a tie lug which is made of ductile or nodular cast iron. A tie lug so made has a tensile and yield strength which allow the tie lug to absorb tremendous joint shocks caused by a sudden increase in pressure on the joint. Also, a ductile or nodular cast iron tie lug possesses a high corrosion resistance. Consequently, there is practically no electrolytic action in the lug itself and in the connection between bell flange, tie lug, and gland.

The objects and advantages of the invention herein described are best accomplished in a pipe coupling which comprises: (a) two coaxially aligned pipes with adjoining ends, one formed with an adjoining spigot end and the other formed with a bell flange, at its adjoining end; (b) a gland, peripherally surrounding the spigot end pipe and spaced from the bell flange of the other pipe; (c) a gasket for sealing said coupling, peripherally surrounding the spigot end pipe and positioned to bear on the adjoining end of said pipe having the bell flange; and (d) means for anchoring a tie rod into said coupling comprising a tie lug having a body positioned so as to have a lower portion thereof extend into the space between the gland and the bell flange, said body having two holes extending through said body, one hole in the lower portion of said body having a bolt extending therethrough and connecting said bell flange with said gland, and the second hole in the upper portion of said body having said tie rod extending therethrough.

It is to be understood that the detailed drawings and specific examples given describe preferred embodiments of our invention and are for purposes of illustration only, that the apparatus of the invention is not limited to the precise details and conditions disclosed, and that various changes may be made therein without departing from the spirit of the invention which is defined by the following claims.

We claim:
1. A pipe coupling which comprises:
   (a) two coaxially aligned pipes with adjoining ends, one formed with an adjoining spigot end and the other formed with a bell flange at its adjoining end;
   (b) a gland, peripherally surrounding the spigot end pipe and spaced from the bell flange of the other pipe;
   (c) a gasket for sealing said coupling, peripherally surrounding the spigot end pipe and positioned to bear on the adjoining end of said pipe having the bell flange; and
   (d) means for anchoring a tie rod into said coupling comprising a tie lug having a body positioned so as to have a lower portion thereof extend into the space between the gland and the bell flange, said body having two holes extending through said body, one hole in the lower portion of said body having a bolt extending therethrough and connecting said bell flange with said gland, and the second hole in the upper portion of said body having said tie rod extending therethrough.

2. The structure of claim 1, wherein the body is made of ductile cast iron.

3. The structure of claim 1 wherein said body has a base and two shoulders and the base of said body and said shoulders are inwardly curved.

4. The structure of claim 1 wherein said tie rod is secured to said tie lug by means of
   (1) threads on the end of said tie rod; and
   (2) a nut to engage said threads.

5. The structure of claim 4, whereby when said tie rod nut is tightened, said body presses said gland into tighter contact with said gasket.

6. In a pipe coupling comprising:
   (a) two coaxially aligned pipes with adjoining ends, one pipe's adjoining end formed with a spigot and the other pipe's adjoining end formed with a bell flange;
   (b) a gland, peripherally surrounding the spigot end pipe and fastened to said bell flange;
   (c) a packing ring, for sealing said coupling, peripherally surrounding the spigot end pipe and positioned between said bell flange and said gland; and
   (d) means for anchoring a tie rod into said coupling; the improvement which comprises, as said means:
   a body with flange means on the upper portion of a side thereof and with two holes through said body, one hole in the lower portion of said body adapted to receive a bolt connecting said bell flange with said gland, the other hole in the upper portion of said body adapted to receive said tie rod, whereby, when said lower portion is positioned between said bell flange and said gland and said bolt passes through said lower portion hole; said body extends radially outwardly from said pipes, said flange extends over and contacts said gland, and said tie rod extends through said upper portion hole and is capable of being fastened to said body.

7. The improvement of claim 6 wherein said flange means comprise two shoulders on opposite sides of said upper portion hole.

8. The improvement of claim 6 whereby when said tie rod is fastened to said body, said body presses said gland into tighter contact with said gasket.

References Cited
UNITED STATES PATENTS

| | | | |
|---|---|---|---|
| 1,889,133 | 11/1932 | Pfefferle | 285—114 |
| 2,108,151 | 2/1938 | Teetor | 285—368 |
| 2,832,615 | 4/1958 | Summers | 285—368 |
| 2,984,504 | 5/1961 | Boughton | 285—374 |
| 3,010,736 | 11/1961 | Dilley | 285—114 |
| 3,144,261 | 8/1964 | Stephens | 285—114 |

CARL W. TOMLIN, *Primary Examiner.*
WAYNE L. SHEDD, *Assistant Examiner.*